Patented Sept. 30, 1947

2,428,340

UNITED STATES PATENT OFFICE 2,428,340

COMPOSITION OF MATTER, ITS PREPARATION AND UTILIZATION

Paul M. Ruedrich, Berkeley, Calif., assignor to Griffin Chemical Company

No Drawing. Application December 21, 1944, Serial No. 569,281

2 Claims. (Cl. 252—42)

This invention relates to a novel composition containing the lithium salt of various organic acids and particularly lithium stearate, the preparation of this composition and its subsequent utilization in lubricants and in other compositions.

In patents Re. 22,299; 2,274,674; 2,274,675; 2,274,676 and 2,293,052, Earle has disclosed the utility of addition of various lithium compounds to lubricating compositions comprising mineral oils, vegetable oils, particularly those of the nondrying classification, chlorinated compounds such as chlorinated diphenyl and chlorinated diphenyl oxide. The lithium compounds contemplated by Earle are numerous and include the lithium soaps of the higher fatty acids such as lithium stearate, lithium palmitate, lithium oleate and the like and the lithium salts of other organic acids such as acetic, butyric, ethyl butyric, ethyl hexoic and caproic acid. The term "lithium additive" is used herein as defining the aforementioned lithium compounds, that is, the lithium salts of the monocarboxylic acids and, more particularly, the lithium soaps, the latter being lithium salts of fatty acids having at least eight carbon atoms.

To be effective, it is necessary that the lithium compound be in solution in the lubricant. For example, in the manufacture of a typical, improved lubricant, the usual procedure is to heat the mineral oil to a temperature of about 440° F. and in some instances to as high as 475° F. to ensure that the lithium stearate goes into solution in the oil. Since the oils used rarely if ever have a flash point as high as 475° F. (the usual range is 150° F. to 375° F. or 65.5° C. to 190.5° C.) it is generally essential that the entire operation be conducted in closed vessels and by a batch operation. Further, once the oil is raised to an elevated temperature it must be cooled. This either requires expensive refrigeration equipment or else large, closed containers must be provided for storing the oil while its temperature drops due to radiation and conduction to the atmosphere, an obviously very slow operation.

I have found that if the lithium additive is first dissolved in a material which is a solvent for the compound and which material is also soluble in the lubricant, the lithium compound solution can thereafter be successfully incorporated into the lubricant to provide the desired lithium additive concentration in the lubricant. I have found that the lithium compound can be incorporated in this manner at a much lower temperature than is otherwise necessary. While it is believed that the several advantages of this are obvious, I will point out that it is only necessary to heat the lithium compound-solvent mixture to a temperature sufficient to ensure that a clear solution results. The solution can then be cooled and stored for subsequent addition to the lubricating oil or grease, as desired. Since the solution can be made up with a relatively high lithium content and since only a small portion is required per volume of lubricant, this does not impose any great difficulty as compared to the present practice. Subsequently, the lithium compound solution is incorporated into the lubricant. However, since the solution of all phases can be effected at a much lower temperature, the manufacturer is not required to resort to extreme heating and to cooling and in fact the addition can be made in a continuous manner. The use of lower temperatures made feasible by this invention is an important adjunct to continuous methods of manufacture and compounding of oils and greases containing lithium additives.

The practice of the present invention and various other features and objects may become further apparent upon consideration of the following detailed examples of such successful utilization.

To illustrate the advantage of first making up the lithium compound solution and utilizing this, I secured a petroleum lubricating oil identified as a "Western 100 pale oil." This was divided into three parts, the first containing 90 grams and the second and third each containing 87.5 grams.

*First batch.*—To the first I added 10 grams of a lithium additive, the stearate, heating the oil with agitation until a clear and homogeneous solution was obtained. The temperature at which this occurred was between 420° F. and 430° F.

*Second batch.*—The second batch of oil was heated under similar conditions after 10 grams of lithium stearate and 2.5 grams of lanolin had been added. The solubilizing temperature for the lithium stearate was only slightly reduced and was in the range between 410° F. and 420° F.

*Third batch.*—Before proceeding to heat the third batch, I mixed 10 grams of lithium stearate and 2.5 grams of lanolin and heated these until a clear solution was obtained. This was permitted to cool, hardening to a dark brown, plastic, transparent mass. There was no evidence of reaction although some heat was liberated when the lithium stearate and lanolin go into solution. The entire lithium stearate-lanolin mass was then added to the third batch of oil and the mixture heated carefully until it was apparent that the lithium stearate-lanolin mixture had gone into solution in the oil. This was observed at a temperature of 365° F.

A comparison of the three greases which resulted from the foregoing three operations showed that the grease produced by the third operation had much less tendency to bleed than the greases from the first two.

*Fourth batch.*—A fourth batch of grease was prepared in the same manner as the third batch, with the exception that I used 2.5 grams of a cyclic primary alcohol (prepared from a naphthenic fraction of a petroleum oil) instead of the lanolin. It was observed that the lithium stearate-alcohol mixture formed a clear and homogeneous solution with the oil between 360° F. and 365° F.

*Fifth batch.*—To illustrate formation of the lithium additive in situ in the solvent, a fifth batch of grease was prepared by first saponifying 9.79 grams of stearic acid with 1.45 grams of lithium hydrate in the presence of 2.50 grams of lanolin and 10.0 grams of water and adding to the dehydrated mixture 87.5 grams of a naphthenic 100 pale oil. On continued heating it was observed that the lithium stearate-lanolin mixture formed a clear solution with the oil at a temperature of 365° F.

In the following are given values enabling one to compare the temperature at which solubility is effected of the additive, lithium stearate, in the indicated oil proceeding in one case in a manner and with quantities similar to those employed in the first batch and in the other case in a manner and with quantities similar to those employed in the third batch. The indicated temperature range is that within which solution occurred in degrees Fahrenheit.

|  | 100 Pale | 300 Pale | 500 Pale | 200 Neutral |
| --- | --- | --- | --- | --- |
| 1. °F | 425–430 | 420–425 | 415–420 | 420–425 |
| 2. °F | 360–365 | 365–370 | 370–375 | 365–370 |

The "200 Neutral" was a Pennsylvania oil and the others were Western oil. In each case, solubility is effected at a substantially lower temperature.

Other materials can be added to the oil as desired and which are to be included in the final compositions including those mentioned by Earle, and others which will occur to those skilled in the art, such as an oxidation inhibitor, and extreme pressure compounds.

As a solvent I can employ any material which is a solvent for the lithium compound or compounds to be added to the lubricant and which is also soluble in the oil. In addition the solvent should have a flash point close to that of the lubricant and preferably above that of the lubricant. The boiling point of the solvent should be above that of the lubricant, in case the latter has a fixed boiling point, and above that of the lower fractions in a lubricant having a number of fractions of different boiling points. I have successfully used each of the following materials as a solvent for the lithium additive, making up the solution first either by incorporating the additive as such in the solvent or by forming the additive from its constituents in situ in the solvent, later incorporating this in the lubricant or other compositions. The list of solvents is not complete and others will be apparent to those skilled in the art.

Animal and vegetable fats:
    Lanolin
    Wool grease
    Lard oil
    Sperm oil
    Cottonseed oil
    Soyabean oil
    Castor oil
    Linseed oil
    Palm oil
    Coconut oil
Animal and vegetable waxes:
    Spermaceti
    Japan wax
Phosphatides:
    Lecithin
Glyceryl esters:
    Glyceryl trilaurin
    Glyceryl distearin
    Glyceryl monopalmitin
    Glyceryl stearo-dipalmitin
Glycol esters:
    Diglycol oleate
    Propylene glycol oleate
    Butoxy ethyl oleate (butyl Cellosolve oleate)
Esters:
    Amyl laurate
    Butyl stearate
    Tetrahydrofurfuryl oleate
    Butyl benzoate
    Cyclohexyl stearate
    Diethyl succinate
    Diethyl adipate
    Dibutyl sebacate
    Dibutyl phthalate
    Ethyl naphthenate
    Methyl abietate
Alcohols:
    Lauryl alcohol
    Cetyl alcohol
    Oleyl alcohol
    Benzyl alcohol
    Diamyl cyclohexanol
    Cyclic (naphthenic) alcohols (Source: Naphthenic fraction of a petroleum oil treated to produce alcohols)
    Terpineol
Fatty acid amines:
    Octadecylamine
    Aminostearine
    Dibutyl lauramide
Alkyl-aryl hydrocarbons:
    Tetra-amyl benzene
    Diamyl naphthalene
Ethers:
    p-Tert-amylphenyl n-butyl ether
    Triglycol dichloride
Substituted phenols:
    2,6-dichloro-4-tert-amyl phenol
    p-Tert-amyl-o-cresol
    Diamyl phenol
Natural resins:
    Rosin
    Rosin oil
Unsaturated petroleum hydrocarbons:
    High molecular weight unsaturated naphthenic petroleum oils
Oxidized petroleum hydrocarbons:
    Oxidized paraffin
    Oxidized paraffinic petroleum oils
    Oxidized naphthenic petroleum oils
Alkali metal salts of organic acids:
    Lithium naphthenate
    Lithium salt of mahogany sulfonic acids Alkaline earth metal salts of organic acids:
  Calcium naphthenate
  Calcium salt of mahogany sulfonic acids Crude materials containing one or more of the above can be employed as can mixtures of two or more of the solvents if they are compatible.

The solvents identified above as oxidized paraffin and oxidized paraffinic and naphthenic petroleum oils, and the salts of the latter materials were made by oxidizing the paraffin or oil by blowing air therethrough while the paraffin or oil was at a temperature of the order of 150° C. and while a catalyst such as iron was present. Suitable procedure for the preparation of the oxidized petroleum hydrocarbons are disclosed in Patents 1,690,768, 1,690,769, 1,863,004, 2,096,390 and 2,335,733. The term "oxidized petroleum hydrocarbon" is employed herein and in the claims as describing the oxidized petroleum hydrocarbon products of the foregoing patents. The salts are readily formed by neutralizing the acids with the base whose salt is desired. Oxidation by treatment with permanganate or chromic acid is also feasible.

The lithium additive solution can be made up to any desired lithium concentration up to the maximum solubility of the additive in the solvent. It is a feature and a characteristic of the solvents which I have disclosed that they are excellent solvents for the additives and will carry as much as 80% by weight and even in some cases more than this of the lithium additive. This is of advantage because I have found that generally small quantities of the solvent impart a greater stability to the grease while enabling solution of the additive to be effected at lower temperatures. For this reason, the lithium additive solution is generally made up to contain at least about 50% by weight of the lithium additive.

The lithium additive solution can be utilized in various other compositions and for other uses. For example, it can be added to rubber as such or compounded with a hydrocarbon wax to improve the rubber or impart new and unusual characteristics. In the term "rubber" I include both natural and artificial rubber including that commonly known as Buna-S, Ameripol, Thiokol, Neoprene or Perbunan: a good definition of rubber and one which I adopt is given in Patent 2,359,675. The lithium additive solution of the present invention added to a rubber improves various characteristics, lubricating the final product both externally and internally. Rubber compounded with the lithium additive solution evidences considerable stability improvement and no sign of bleeding over a wide range of temperatures, has a normal or even an increased resilience, a lower coefficient of friction to metals than an otherwise identical rubber and is highly resistant to oxidation. Compounding the additive solution with a wax generally enhances these improvements.

To illustrate the manufacture of the lithium aditive solution-wax composition of the present invention, 10 grams of lithium stearate and 2.5 grams of lanolin were heated together until a clear solution was obtained. To the resulting mass, 87.5 grams of paraffin wax were added. The wax had a melting point of 122° F. At 370° F. the mixture formed a clear solution but no evidence of reaction was apparent. On cooling, this solution became a hard plastic mass which melted at about 195° F. Such a wax has many uses in addition to its utility in rubber as in the textile industry, for phonograph records, in paints and varnishes, cosmetics and many others.

In making up a rubber composition, the lithium additive solution alone or as compounded with a wax, is milled with the rubber, carbon black, zinc oxide, accelerators, sulphur and other components such as a torque reducing agent and an antioxidant. After suitable milling the product is molded and vulcanized in the usual manner. The composition is compatible with all usual ingredients customarily employed in rubber compounding. From 2% to 20% usually suffice with a 10% dosage (weight) being sufficient to impart the desired degree of improvement. The composition usually does not necessitate a change in formulation, being merely added as an adjunct to a predetermined mixture.

As a hydrocarbon wax one can use any suitable wax as paraffin, ceresin, ozokerite or montan wax. The quantity of lithium additive solution can be varied in the wax compounding. Since it is the more expensive ingredient it is usually employed in a smaller quantity than is the wax. One can use a sufficient quantity of the additive solution to give from as little as 2% lithium additive up to as much as 50% thereof by weight of the wax.

In addition to the various uses which I have indicated for the lithium additive solution, one can employ the solution to advantage in suitable quantities as a plasticizer or a modifier in connection with the manufacture of various products such as synthetic resins, synthetic resin coating compositions, lacquers, paints, asphaltic compositions, impregnating materials, polishing waxes, in rubber, in molding compositions as used in dentistry and the arts and crafts, as a plasticizer for cement and in coating compositions. The quantity of lithium additive utilized should be sufficient to ensure in the final product the desired effect. In a lubricant the quantity can vary over a wide range as Earle has indicated, between small quantities of the order of 2% to larger quantities of the order of 40%, although from 5% to 20% by weight usually suffices with 10% being an average. The lithium additives are usually compatible with other materials present in the composition wherein the additive is employed, and the use of these is therefore contemplated.

I claim:

1. A process for preparing a lubricating composition comprising heating a mixture of a lithium soap and an oxidized petroleum hydrocarbon to form a solution, adding the so-formed solution to a mineral oil of lubricating viscosity, said oil being heated to a temperature below the flash point thereof, said lithium salt being present in the oil in an amount sufficient to substantially thicken the oil, said oxidized petroleum hydrocarbon having a flash point above that of the oil and being soluble in the oil.

2. A process for preparing a lubricating composition comprising heating a mixture of lithium stearate and an oxidized petroleum hydrocarbon to form a solution, adding the so-formed solution to a mineral oil of lubricating viscosity, said oil being heated to a temperature below the flash point thereof, said lithium salt being present in the oil in an amount sufficient to substantially thicken the oil, said oxidized petroleum hydrocarbon having a flash point above that of the oil and being soluble in the oil.

PAUL M. RUEDRICH.

(References on following page)

REFERENCES CITED

The following references are of record in the file of this patent:

UNITED STATES PATENTS

| Number | Name | Date |
|---|---|---|
| 1,881,591 | Horwitz | Oct. 11, 1932 |
| 1,939,170 | Horwitz | Dec. 12, 1933 |
| 2,197,835 | Reiff | Apr. 23, 1940 |
| 2,318,668 | Calkins | May 11, 1943 |
| 2,351,384 | Woods et al. | June 13, 1944 |
| 2,368,522 | Cornell et al. | Jan. 30, 1945 |
| 2,375,485 | Morgan et al. | May 8, 1945 |
| 2,376,312 | Morgan | May 15, 1945 |
| 2,379,850 | Morgan | July 3, 1945 |
| 2,381,314 | Shields | Aug. 7, 1945 |
| 2,383,146 | Morgan | Aug. 21, 1945 |
| 2,390,450 | Morgan | Dec. 4, 1945 |
| 2,397,956 | Fraser | Apr. 9, 1946 |
| 2,398,173 | Brunstrum et al. | Apr. 9, 1946 |
| 2,403,104 | Lien | July 2, 1946 |
| 2,411,587 | Morway et al. | Nov. 26, 1946 |

OTHER REFERENCES

Meyer—The Role of Lithium Stearate in Greases and Waxes, article in Foote Prints, vol. 16, No. 1, 1944, page 308.